United States Patent
Yang et al.

(10) Patent No.: US 12,228,673 B2
(45) Date of Patent: Feb. 18, 2025

(54) FREQUENCY MODULATED CONTINUOUS WAVE RADAR DEVICE AND SIGNAL PROCESSING METHOD THEREOF

(71) Applicant: RichWave Technology Corp., Taipei (TW)

(72) Inventors: Shun-Pin Yang, Taipei (TW); Hsiang-Feng Chi, Taipei (TW)

(73) Assignee: RichWave Technology Corp., Taipei (TW)

( * ) Notice: Subject to any disclaimer, the term of this patent is extended or adjusted under 35 U.S.C. 154(b) by 379 days.

(21) Appl. No.: 17/570,343

(22) Filed: Jan. 6, 2022

(65) Prior Publication Data
US 2023/0078775 A1    Mar. 16, 2023

(30) Foreign Application Priority Data
Sep. 16, 2021 (TW) .................................. 110134683

(51) Int. Cl.
G01S 7/02 (2006.01)
G01S 7/35 (2006.01)

(52) U.S. Cl.
CPC ............ *G01S 7/0232* (2021.05); *G01S 7/354* (2013.01)

(58) Field of Classification Search
None
See application file for complete search history.

(56) References Cited

U.S. PATENT DOCUMENTS

| | | | |
|---|---|---|---|
| 5,576,977 A | 11/1996 | Eskildsen | |
| 5,581,237 A | 12/1996 | DiPoala | |
| 9,575,159 B2 | 2/2017 | Lee | |
| 10,855,328 B1 * | 12/2020 | Gulati | ................... G01S 7/0234 |

(Continued)

FOREIGN PATENT DOCUMENTS

| | | |
|---|---|---|
| CN | 109407088 | 3/2019 |
| CN | 110187311 | 8/2019 |

(Continued)

OTHER PUBLICATIONS

"Office Action of Taiwan Counterpart Application", issued on May 3, 2022, p. 1-p. 4.

*Primary Examiner* — Ladimir Magloire
*Assistant Examiner* — David C. Schultz
(74) *Attorney, Agent, or Firm* — JCIPRNET

(57) ABSTRACT

A frequency modulated continuous wave (FMCW) radar device and a signal processing method thereof are provided. The frequency modulated continuous wave radar device includes a transmitter stage circuit, a frequency synthesizer, a receiver stage circuit, a pre-stage circuit, and a signal processing circuit. The transmitter stage circuit transmits a transmitting signal. The frequency synthesizer generates the transmitting signal associated with a chirp period. The receiver stage circuit receives a receiving signal including a periodic interference signal with a noise period associated with the chirp period. The pre-stage circuit outputs a to-be-processed signal including multiple frames according to the receiving signal and the transmitting signal. The signal processing circuit groups the frames into multiple frame groups. The signal processing circuit generates a processed signal by sampling at least one frame from the multiple frames in each of the frame groups with an identical sampling rule.

20 Claims, 8 Drawing Sheets

(56) References Cited

U.S. PATENT DOCUMENTS

| | | | |
|---|---|---|---|
| 2015/0212195 A1 | 7/2015 | Lee | |
| 2017/0219689 A1* | 8/2017 | Hung | G01S 7/0232 |
| 2020/0072941 A1* | 3/2020 | Jansen | G01S 13/343 |
| 2020/0088838 A1* | 3/2020 | Melzer | G01S 7/352 |
| 2020/0284876 A1 | 9/2020 | Hurd et al. | |
| 2020/0321928 A1* | 10/2020 | Rao | G01S 13/931 |
| 2020/0408891 A1* | 12/2020 | Brett | G01S 13/931 |
| 2021/0003662 A1* | 1/2021 | Aydogdu | G01S 13/343 |
| 2021/0156982 A1* | 5/2021 | Stettiner | G01S 7/35 |

FOREIGN PATENT DOCUMENTS

| | | |
|---|---|---|
| CN | 106908794 | 11/2019 |
| EP | 3673286 | 3/2021 |
| IN | 111707991 | 9/2020 |
| TW | 201425975 | 7/2014 |
| TW | 201534952 | 9/2015 |
| TW | 202030987 | 8/2020 |
| TW | 202127059 | 7/2021 |
| WO | 2020165952 | 8/2020 |

\* cited by examiner

FREQUENCY MODULATED CONTINUOUS WAVE RADAR DEVICE AND SIGNAL PROCESSING METHOD THEREOF

CROSS-REFERENCE TO RELATED APPLICATION

This application claims the priority benefit of Taiwanese application no. 110134683, filed on Sep. 16, 2021. The entirety of the above-mentioned patent application is hereby incorporated by reference herein and made a part of this specification.

BACKGROUND

Technical Field

The disclosure relates to a radar device, and in particular, to a frequency modulated continuous wave radar device and a signal processing method thereof.

Description of Related Art

Generally, conventional radars may include pulse radars and continuous wave radars. The continuous wave radars may emit a single-frequency continuous wave (CW) or a frequency modulated continuous wave (FMCW), and a distance and a speed of a human, an animal, or any to-be-detected object relative to the radar may be measured according to a time delay and a frequency deviation between a transmitting signal and a receiving signal. To reduce a periodic influence generated by an interference source (such as a light, an electrical fan, a power noise) in the environment on the radar signal, a comb filter may be conventionally adopted, or a dynamically-adjusted threshold value for triggering an alarm may be used. However, the comb filer may eliminate a fundamental frequency of an interference signal and its high power harmonic. A high frequency component of a non-interference signal may be removed. As for dynamic threshold values, there may be less universality since different threshold values may be required for different types or properties of the interference sources, and furthermore, with the threshold value changed, an interference signal is not indeed eliminated. As a result, how to eliminate a periodic interference signal and to enhance the reliability of a radar device performing radar measurements has become a technical topic.

SUMMARY

Accordingly, the disclosure is directed to a frequency modulated continuous wave radar device and a signal processing method thereof capable of eliminating a periodic interference signal and enhancing reliability of the radar device.

In an embodiment of the disclosure, a frequency modulated continuous wave radar device includes a transmitter stage circuit, a frequency synthesizer, a receiver stage circuit, a pre-stage circuit, and a signal processing circuit. The transmitter stage circuit is configured to transmit a transmitting signal. The frequency synthesizer is coupled to the transmitter stage circuit. The frequency synthesizer is configured to generate the transmitting signal associated with a chirp period. A frequency of the transmitting signal changes with time in the chirp period. The receiver stage circuit is configured to receive a receiving signal. The receiving signal is formed after the transmitting signal is transmitted to a target object and reflected. The receiving signal includes a periodic interference signal with a noise period. The pre-stage circuit is coupled to the frequency synthesizer and the receiver stage circuit. The pre-stage circuit is configured to output a to-be-processed signal according to the receiving signal and the transmitting signal. The to-be-processed signal includes multiple frames. The signal processing circuit is coupled to the pre-stage circuit. The signal processing circuit groups the multiple frames into multiple frame groups according to a sampling frequency associated with the chirp period, and the chirp period is associated with the noise period. The signal processing circuit generates a processed signal by sampling at least one frame from the multiple frames in each of the frame groups with an identical sampling rule.

In an embodiment of the disclosure, the signal processing method is adapted to a frequency modulated continuous wave radar device. The signal processing method includes the following. A transmitting signal associated with a chirp period is generated. A frequency of the transmitting signal changes with time in the chirp period. The transmitting signal is transmitted. A receiving signal is received. The receiving signal is formed after the transmitting signal is transmitted to a target object and reflected. The receiving signal includes a periodic interference signal with a noise period. A to-be-processed signal is output according to the receiving signal and the transmitting signal. The to-be-processed signal includes multiple frames. The multiple frames are grouped into multiple frame groups according to a sampling frequency associated with the chirp period, and the chirp period is associated with the noise period. A processed signal is generated by sampling at least one frame from the multiple frames in each of the frame groups with an identical sampling rule.

Based on the above, in the frequency modulated continuous wave radar device and the signal processing method thereof described in various embodiments of the disclosure, the transmitting signal may be transmitted from the transmitter stage circuit according to the chirp period associated with the noise period. The receiving signal may be formed and received at the receiver stage circuit after the reflection of the target object. Then, the to-be-processed signal including the multiple frames is output through the pre-stage circuit, and the multiple frames are grouped into multiple frame groups through the signal processing circuit according to the sampling frequency associated with the chirp period. The signal processing circuit may sample at least one frame from each of the multiple frame groups according to the identical sampling rule, so as to reduce the influence of a periodic interference signal in the receiving signal and to enhance the reliability of the radar device.

In order to make the aforementioned features of the disclosure more comprehensible, embodiments accompanied with drawings are described in detail below.

DESCRIPTION OF THE EMBODIMENTS

Figure 1:
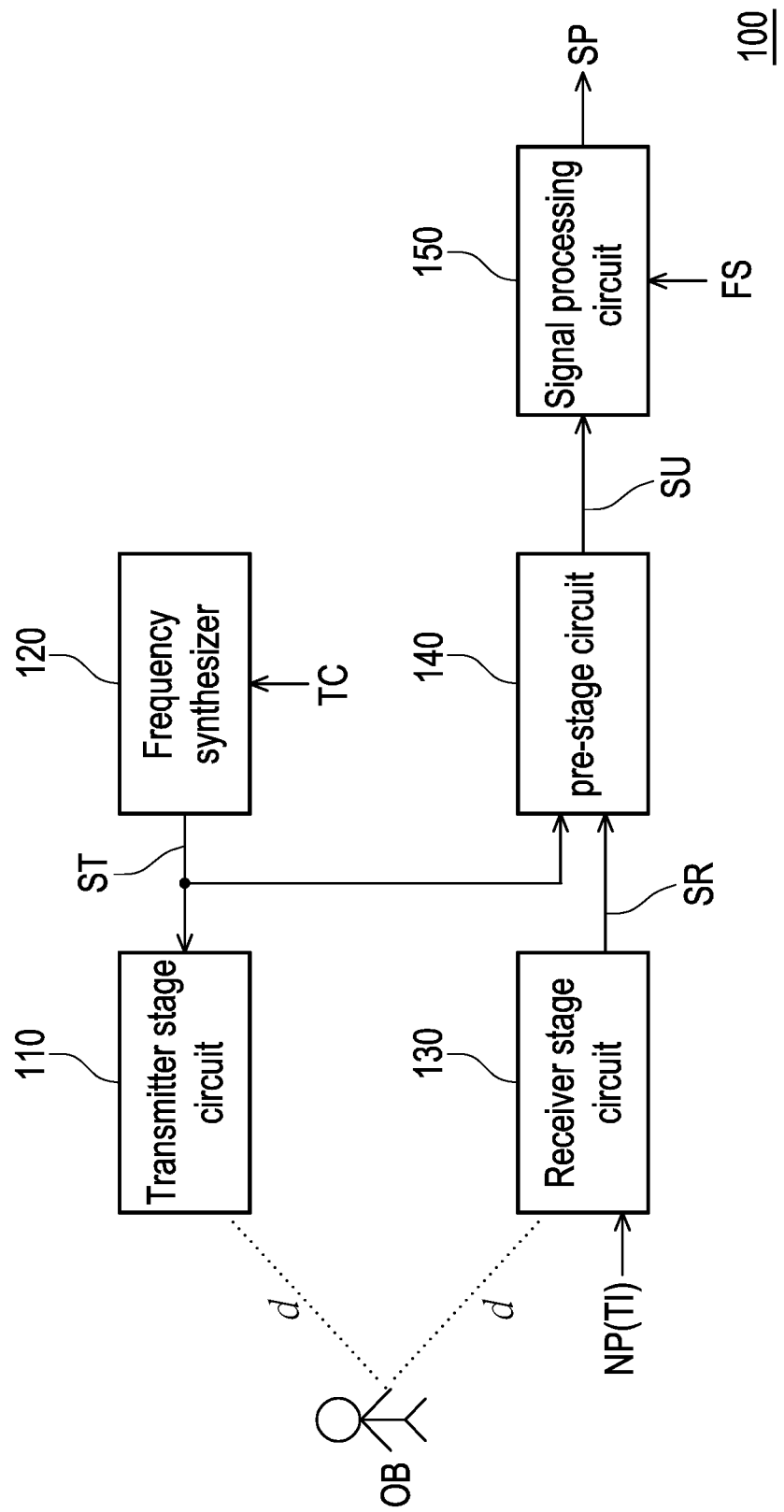
FIG. 1 is a circuit block diagram of a frequency modulated continuous wave radar device according to an embodiment of the disclosure.

The term "coupling (or connecting)" used in the full disclosure (including the claims) may refer to any direct or indirect connection means. For example, in the disclosure, if the first device is coupled (or connected) to the second device, it should be interpreted that the first device may be directly connected to the second device, or the first device may be indirectly connected to the second device through another device or a certain connection means. Throughout the description, including the claims, the terms such as "first", and "second" are used to name different elements or distinguish between different embodiments or ranges, instead of setting an upper limit or a lower limit on the number of elements or limiting an order of the elements. In addition, wherever possible, the elements/components/steps with the same reference numerals in the drawings and embodiments represent the same or similar parts. Elements/components/steps referred to by the same terms or reference numerals in different embodiment may be referred to each other for relevant description.

FIG. 1 is a circuit block diagram of a frequency modulated continuous wave (FMCW) radar device 100 according to an embodiment of the disclosure. In an embodiment shown in FIG. 1, the FMCW radar device 100 includes a transmitter stage circuit 110, a frequency synthesizer 120, a receiver stage circuit 130, a pre-stage circuit 140 and a signal processing circuit 150. The frequency synthesizer 120 is coupled to the transmitter stage circuit 110. The pre-stage circuit 140 is coupled to the frequency synthesizer 120 and the receiver stage circuit 130. The signal processing circuit 150 is coupled to the pre-stage circuit 140. According to the demand of design, in some embodiments, the receiver stage circuit 130 and the pre-stage circuit 140 may be implemented as an analog circuit. The signal processing circuit 150 may be implemented as a digital circuit, software, or firmware. However, the disclosure is not limited thereto.

According to the demand of design, the signal processing circuit 150 may be a central processing unit (CPU), a microcontroller unit (MCU), a digital signal processor (DSP), a programmable logic controller (PLC), a digital signal processor (DSP), application specific integrated Circuits (ASIC), a programmable logic device (PLD), or other similar devices or the combinations thereof. In other embodiments, various operation functions of the signal processing circuit 150 may be realized by ways of a hardware circuit. As for detailed steps and implementation of the signal processing circuit 150, sufficient teaching, suggestion and implementation may be obtained from the common knowledge in the technical field.

Figure 2:
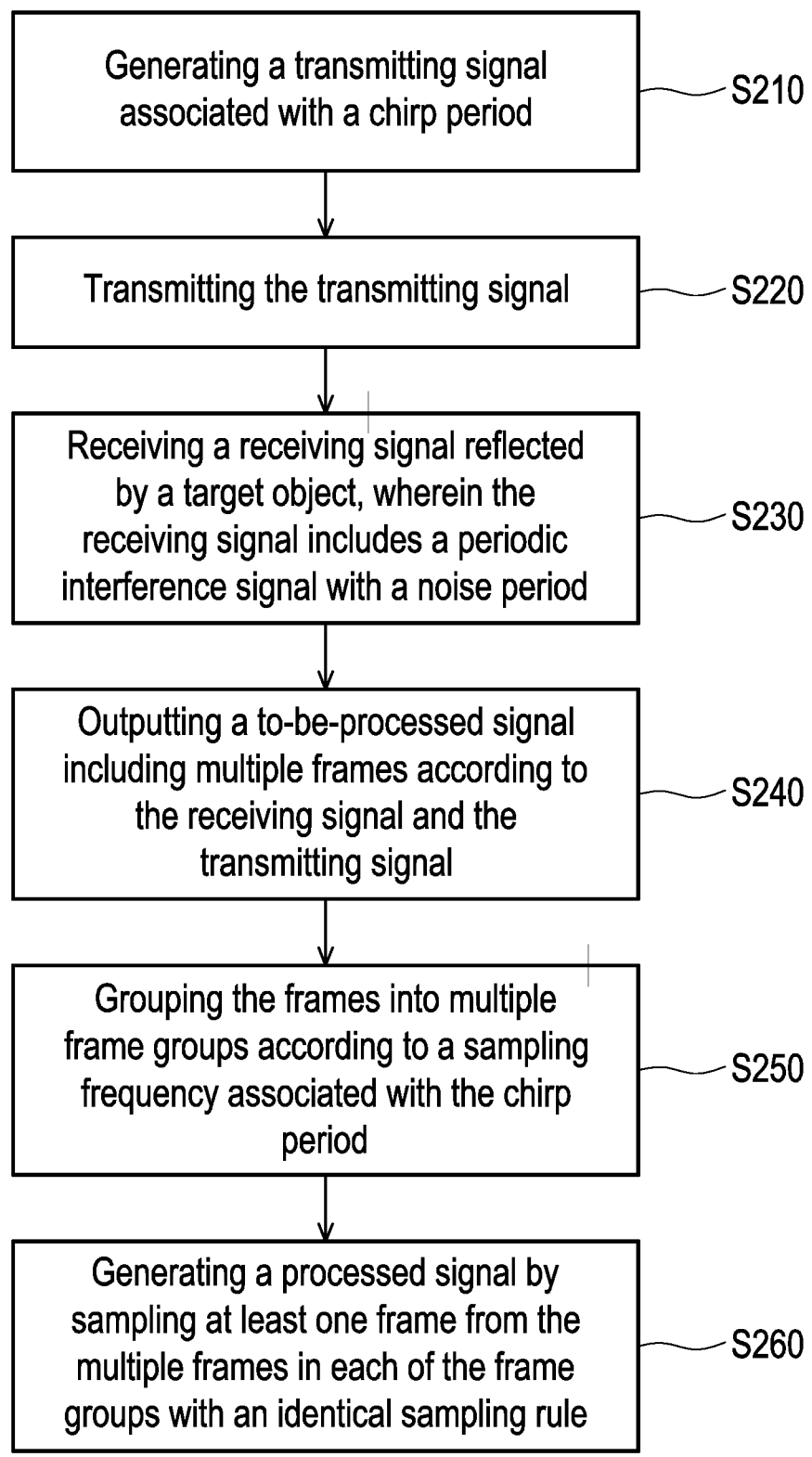
FIG. 2 is a flow chart of a signal processing method according to an embodiment of the disclosure.

FIG. 2 is a flow chart of a signal processing method according to an embodiment of the disclosure. Details of the FMCW radar device 100 shown in FIG. 1 and (or) a FMCW radar device 400 shown in FIG. 4 may be referred to the relevant description about FIG. 2. Referring to FIG. 1 and FIG. 2 together, in step S210, the frequency synthesizer 120 may generate a transmitting signal ST associated with a chirp period TC. A frequency of the transmitting signal ST changes with time in the chirp period TC. For example, the transmitting signal ST may be a frequency modulated continuous wave including a triangle frequency modulated continuous wave, a sawtooth frequency modulated continuous wave, or other types of frequency modulated continuous waves, and the disclosure is not limited thereto.

In step S220, the transmitter stage circuit 110 may transmit the transmitting signal ST. After the transmitting signal ST is transmitted to a target object OB, it may be reflected by the target object OB to form a receiving signal SR. According to the actual application, the target object OB may be a human, an animal, an object, or any type of to-be-detected object. In step S230, the receiver stage circuit 130 may receive the receiving signal SR. The receiving signal SR may include a periodic interference signal NP with a noise period TI. For example, the receiving signal SR may include a periodic interference signal NP with a frequency of 50 Hz or 60 Hz (in other words, a noise period TI of 20 ms or 16.66 ms), or a periodic interference signal NP with another frequency (i.e., another noise period).

In step S240, the pre-stage circuit 140 may output a to-be-processed signal SU according to the receiving signal SR and the transmitting signal ST. The to-be-processed signal SU includes multiple frames. For example, the pre-stage circuit 140 may perform frequency mixing, analog-to-digital conversion, and (or) other pre-processing on the transmitting signal ST and the receiving signal SR to output the to-be-processed signal SU with multiple frames, and the to-be-processed signal SU may be further processed by the signal processing circuit 150.

In step S250, the signal processing circuit 150 may group the multiple frames SF in the to-be-processed signal SU into multiple frame groups according to a sampling frequency FS associated with the chirp period TC. According to the demand of design, in some embodiments, the sampling frequency FS may be 6 to 48 KHz, or other frequency greater than the noise period TI, and the disclosure is not limited thereto. In step S260, the signal processing circuit 150 may generate a processed signal SP by sampling at least one frame from the multiple frames in each of the frame groups with an identical sampling rule. The processed signal SP may be used to determine the space information of the target object OB and the FMCW radar device 100, such as a distance d, a relative speed, or other measurement properties. The detailed determination method may be referred to a conventional radar detection technology and may not be repeated. In the embodiment, the distance d between the transmitter stage circuit 110 and the target object OB is equal to the distance d between the receiver stage circuit 130 and the target object OB. However, the disclosure is not limited thereto.

Figure 3:
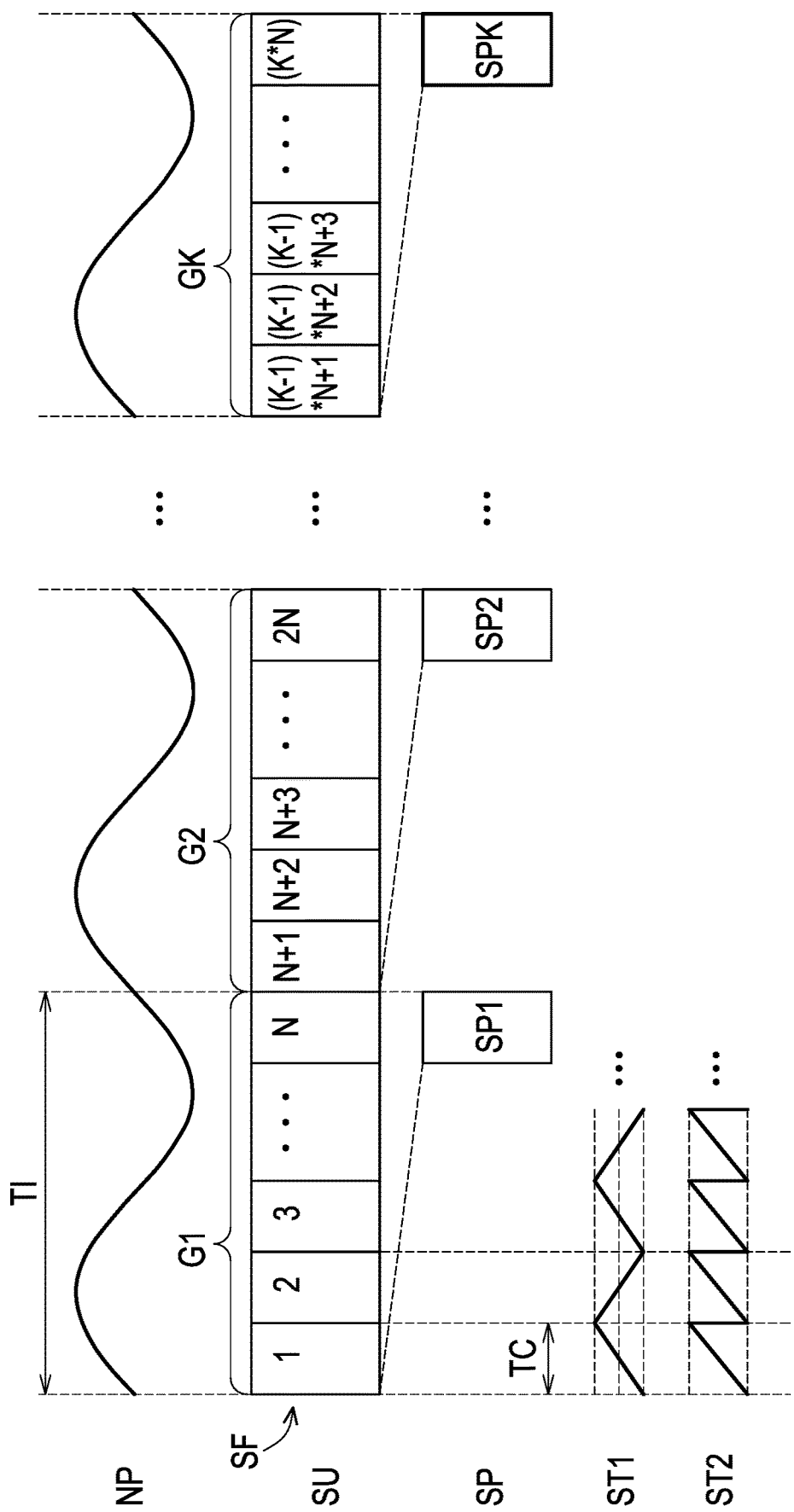
FIG. 3 is a schematic diagram illustrating action waveforms of a frequency modulated continuous wave radar device according to an embodiment of the disclosure.

For example, FIG. 3 is a schematic diagram illustrating action waveforms of the FMCW radar device 100 according to an embodiment of the disclosure. The horizontal axis shown in FIG. 3 represents time. In an embodiment shown in FIG. 3, the transmitter stage circuit 110 may transmit the transmitting signal ST associated with the chirp period TC. A particular waveform of the transmitting signal ST may be determined according to the actual design. For example, in some embodiments, the transmitter stage circuit 110 may transmit a triangle frequency modulated continuous wave ST1 (the transmitting signals ST) with a period twice the chirp period TC. In other embodiments, the transmitter stage circuit 110 may also transmit a sawtooth frequency modulated continuous wave ST2 (the transmitting signals ST) with a period equal to the chirp period TC. The receiving signal SR received by the receiver stage circuit 130 may include the periodic interference signal NP with the noise period TI. The pre-stage circuit 140 may output the to-be-processed signal SU according to the transmitting signal ST (e.g. the triangle frequency modulated continuous wave ST1 or the sawtooth frequency modulated continuous wave ST2) and the receiving signal SR. The to-be-processed signal SU includes the multiple frames SF.

Note that in the embodiment, the chirp period TC is associated with the noise period TI. For example, in some embodiments, the chirp period TC and the noise period TI may be related where a product of a value K and the noise period TI is equal to (or approximately equal to) a product of a value N and the chirp period TC, that is, equation K*TI=N*TC. The value K and the value N are both positive integers, and they may be set according to the actual demand. Phase "approximately equal" may be redefined according to actual design. For example, in some embodiments, difference between the product K*TI and the product N*TC may not exceed 1% (or, other predetermined threshold). For example, assuming that the noise period TI is 16.66 ms and the chirp period TC is 11.141 seconds, the value K may be equal to 8 and the value N may be equal to 12. That is, 8*16.66=133.28 is approximately equal to 12*11.141=133.693.

In the embodiment shown in FIG. 3, the value K is assumed to be equal to 1, which means one noise period TI is N times the chirp period TC (i.e., TI=N*TC). In the embodiment shown in FIG. 3, the to-be-processed signal SU includes multiple frames SF. In FIG. 3, the blocks marked as "1", "2", "3", . . . , "N", "N+1", "N+2", "N+3", . . . , "2N", . . . , "(K−1)*N+1", "(K−1)*N+2", "(K−1)*N+3", . . . , "K*N" represent different frames SF in the to-be-processed signal SU. The signal processing circuit 150 may group the multiple frames SF into frame groups G1, G2, . . . , GK according to the sampling frequency FS associated with the chirp period TC. Each of the frame groups G1 to GK includes N frames SF. For example, based on of the duration of the noise period TI, frames SF marked as "1" to "N" are grouped into frame group G1, and frames SF marked as "N+1" to "2N" are grouped into frame group G2. Accordingly, frames SF marked as "(K−1)*N+1" to "K*N" are grouped into frame group GK.

In the embodiment, the signal processing circuit 150 may generate the processed signal SP by sampling at least one frame from the N frames SF in each of the frame groups G1 to GK with the identical sampling rule. For example, based on the identical sampling rule, the signal processing circuit 150 may sample at least one frame from the frames SF marked as "1" to "N" in the frame group G1 to generate a processed signal SP1, and may sample at least one frame from the frames SF marked as "N+1" to "2N" in the frame group G2 to generate a processed signal SP2. Likewise, based on the identical sampling rule, the signal processing circuit 150 may sample at least one frame from the frames SF marked as "(K−1)*N+1" to "K*N" in the frame group GK to generate a processed signal SPK. The processed signal SP includes the processed signals SP1 to SPK corresponding to the frame groups G1 to GK respectively.

According to the actual design, in some embodiments, the sampling rule may include, in a current frame group of the frame groups G1 to GK, selecting at least one frame from the N frames SF thereof as a processed signal for the current frame group. The sequential position of the selected at least one frame in one frame group of the frame groups G1 to GK is the same as the sequential position of the selected at least one frame in another frame group. For example, in some embodiments, the first frame SF (the frame SF marked as "1") in the frame group G1 is selected as the processed signal SP1 for the frame group G1, the first frame SF (the frame SF marked as "N+1") in the frame group G2 is selected as the processed signal SP2 for the frame group G2, and the first frames SF (the frame SF marked as "(K−1)*N+ 1") in the frame group GK is selected as the processed signal SPK for the frame group GK. The frame SF marked as "1", the frame SF marked as "N+1" . . . , and the frame SF marked as "(K−1)*N+1" respectively locate at the same sequential position in each of the frame groups G1 to GK.

For example, in other embodiments, the sampling rule may include, in a current frame group of the frame groups G1 to GK, selecting all the N frames SF and performing an accumulation operation to generate an accumulated frame which serves as a processed signal for the current frame group. Taking the frame group G1 as an example, the signal processing circuit 150 may select all the frames SF marked as "1" to "N" in the frame group G1 and perform an accumulation operation to generate the accumulated frame. The accumulated frame serves as the processed signal SP1 for the current frame group G1. As for the rest frame groups G2 to GK, processed signals SP2 to SPK may be generated similarly with reference to the frame group G1 and the processed signal SP1, and thus relevant details may not be repeated in the following.

In still other embodiments, the sampling rule may include, in a current frame group of the frame groups G1 to GK, selecting multiple frames from the N frames SF thereof and performing an accumulation operation on the selected multiple frames SF to generate an accumulated frame. The accumulated frame serves as a processed signal for the current frame group. Sequential positions of the selected multiple frames SF in one frame group of the frame groups G1 to GK are the same as sequential positions of the selected multiple frames SF in another frame group. For example, the signal processing circuit 150 may select the first frame SF and the Nth frame SF (the two frames SF marked as "1" and "N") in the frame group G1 and perform the accumulation operation to generate a first accumulated frame as the processed signal SP1 for the frame group G1. The signal processing circuit 150 may select the first frame SF and the Nth frame SF (the two frames SF marked as "N+1" and "2N") in the frame group G2 and perform the accumulation operation to generate a second accumulated frame as the processed signal SP2 for the frame group G2. Likewise, with an identical sampling rule, the signal processing circuit 150 may select the first frame SF and the Nth frame SF (the two frames SF marked as "(K−1)*N+1" and "K*N") in the frame group GK and perform the accumulation operation to generate a Kth accumulated frame as the processed signal SPK for the frame group GK.

Furthermore, in still other embodiments, the sampling rule may include, in a current frame group of the frame groups G1 to GK, selecting a first part from the N frames SF thereof and performing an accumulation operation to generate a first accumulated frame, and further selecting a second part from the N frames SF and performing the accumulation operation to generate a second accumulated frame. The first accumulated frame and the second accumulated frame serve as the processed signal for the current frame group. For example, in the embodiment, assuming that the transmitting signal ST transmitted by the transmitter stage circuit 110 is a triangle frequency modulated continuous wave ST1 with a period twice the chirp period TC, the signal processing circuit 150 may classify, in each of the frame groups G1 to GK, all the N frames SF into a first part and a second part. For example, the signal processing circuit 150 may select the odd-numbered frames SF (frames SF marked as "1", "3", . . . ) in frame group G1 as the first part and perform the accumulation operation to generate the first accumulated frame, and the signal processing circuit 150 may select the even-numbered frames SF (frames SF marked as "2", . . . ) in frame group G1 as the second part and perform the accumulation operation to generate the second accumulated frame. The odd-numbered frames SF (frames SF marked as "1", "3", . . . ) may correspond to multiple frames during various frequency increasing periods of the triangle frequency modulated continuous wave ST1, and the even-numbered frames SF (frames SF marked as "2", . . . ) may correspond to multiple frames during various frequency decreasing periods of the triangle frequency modulated continuous wave ST1. Next, the signal processing circuit 150 may use the first accumulated frame and the second accumulated frame as the processed signal SP1 for the frame group G1. As for the rest frame groups G2 to GK, ways of selecting frames and performing an accumulation operation may be referred those of the frame group G1, and thus relevant details may not be repeated in the following.

For example, in still other embodiments, the sampling rule may include, in a current frame group of the frame groups G1 to GK, selecting all the N frames SF and performing an average operation to generate an average frame which serves as a processed signal for the current frame group. Taking the frame group G1 as an example, the signal processing circuit 150 may select all the frames marked as "1" to "N" in the frame group G1 and perform an average operation to generate the average frame. The average frame serves as the processed signal SP1 for the current frame group G1. As for the rest frame groups G2 to GK, processed signals SP2 to SPK may be generated similarly with reference to the frame group G1 and the processed signal SP1, and thus relevant details may not be repeated in the following.

In still other embodiments, the sampling rule may include, in a current frame group of the frame groups G1 to GK, selecting a part of frames from the N frames SF thereof and performing an average operation on the selected part of frames SF to generate an average frame. The average frame serves as a processed signal for the current frame group. Sequential positions of the selected part of frames SF in one frame group of the frame groups G1 to GK are the same as sequential positions of the selected part of frames SF in another frame group. For example, the signal processing circuit 150 may select the first frame SF and the Nth frame SF (the two frames SF marked as "1" and "N") in the frame group G1 and perform the average operation to generate a first average frame as the processed signal SP1 for the frame group G1. The signal processing circuit 150 may select the first frame SF and the Nth frame SF (the two frames SF marked as "N+1" and "2N") in the frame group G2 and perform the average operation to generate a second average frame as the processed signal SP2 for the frame group G2. Likewise, with an identical sampling rule, the signal processing circuit 150 may select the first frame SF and the Nth frame SF (the two frames SF marked as "(K−1)*N+1" and "K*N") in the frame group GK and perform the average operation to generate a Kth average frame as the processed signal SPK for the frame group GK.

Furthermore, in still other embodiments, the sampling rule may include, in a current frame group of the frame groups G1 to GK, selecting a first part from the N frames SF thereof and performing an average operation to generate a first average frame, and further selecting a second part from the N frames SF and performing the average operation to generate a second average frame. The first average frame and the second average frame serve as the processed signal for the current frame group. For example, in the embodiment, assuming that the transmitting signal ST transmitted by the transmitter stage circuit 110 is a triangle frequency modulated continuous wave ST1 with a period twice the chirp period TC, the signal processing circuit 150 may classify, in each of the frame groups G1 to GK, all the frames SF into a first part and a second part. For example, the signal processing circuit 150 may select the odd-numbered frames SF (frames SF marked as "1", "3" . . . ) in frame group G1 as the first part and perform the average operation to generate the first average frame, and the signal processing circuit 150 may select the even-numbered frames SF (frames SF marked as "2", . . . ) in frame group G1 as the second part and perform the average operation to generate the second average frame. The odd-numbered frames SF (frames SF marked as "1", "3" . . . ) may correspond to multiple frames during various frequency increasing periods of the triangle frequency modulated continuous wave ST1, and the even-numbered frames SF (frames SF marked as "2", . . . ) may correspond to multiple frames during various frequency decreasing periods of the triangle frequency modulated continuous wave ST1. Next, the signal processing circuit 150 may use the first average frame and the second average frame as the processed signal SP1 for the frame group G1. As for the rest frame groups G2 to GK, ways of selecting frames and performing an accumulation operation may be referred those of the frame group G1, and thus relevant details may not be repeated in the following.

In summary of the above, the transmitter stage circuit 110 may transmit the transmitting signal ST according to the chirp period TC associated with the noise period TI, and the signal processing circuit 150 may group the frames SF in the to-be-processed signal SU into the multiple frame groups G1 to GK according to the sampling frequency FS associated with the chirp period TC. The signal processing circuit 150 may sample at least one frame from the frames SF in each of the frame groups G1 to GK according to any of the above sampling rules. According to the actual design, the signal processing circuit 150 may take the sampled at least one frame SF from the current frame group as the processed signal SP for the current frame group. Alternatively, the signal processing circuit 150 may select a part of or all of the frames SF in the current frame group and perform the accumulation operation to generate the accumulated frame as the processed signal SP for the current frame group. Alternatively, the signal processing circuit 150 may select a part of or all of the frames SF in the current frame group and perform the average operation to generate the average frame as the processed signal SP for the current frame group. During each of the noise periods of the periodic interference signal NP, since the signal processing circuit 150 may sample the at least one frame SF with the identical sampling rule and perform various operations to generate the processed signal SP for each of the frame groups, the influence of the interference signal NP on each corresponding frame group in the processed signal SP may be almost identical. Therefore, the interference signal NP may be regarded as a background signal that does not affect the determination of the space information of the target object OB. As a result, the signal processing circuit 150 may smooth an interference component in the processed signal SP, where the interference component is associated with the periodic interference signal NP. Since the component associated with the periodic interference signal NP is smoothed, a back-end circuit (system) may easily eliminate (or ignore) the interference component in the processed signal SP which may be associated with the periodic interference signal NP. In addition, the signal processing circuit 150 may keep a signal (with a period less than the chirp period TC) corresponding to a high power harmonic frequency in the receiving signal SR to enhance the reliability of the FMCW radar device 100.

Figure 4:
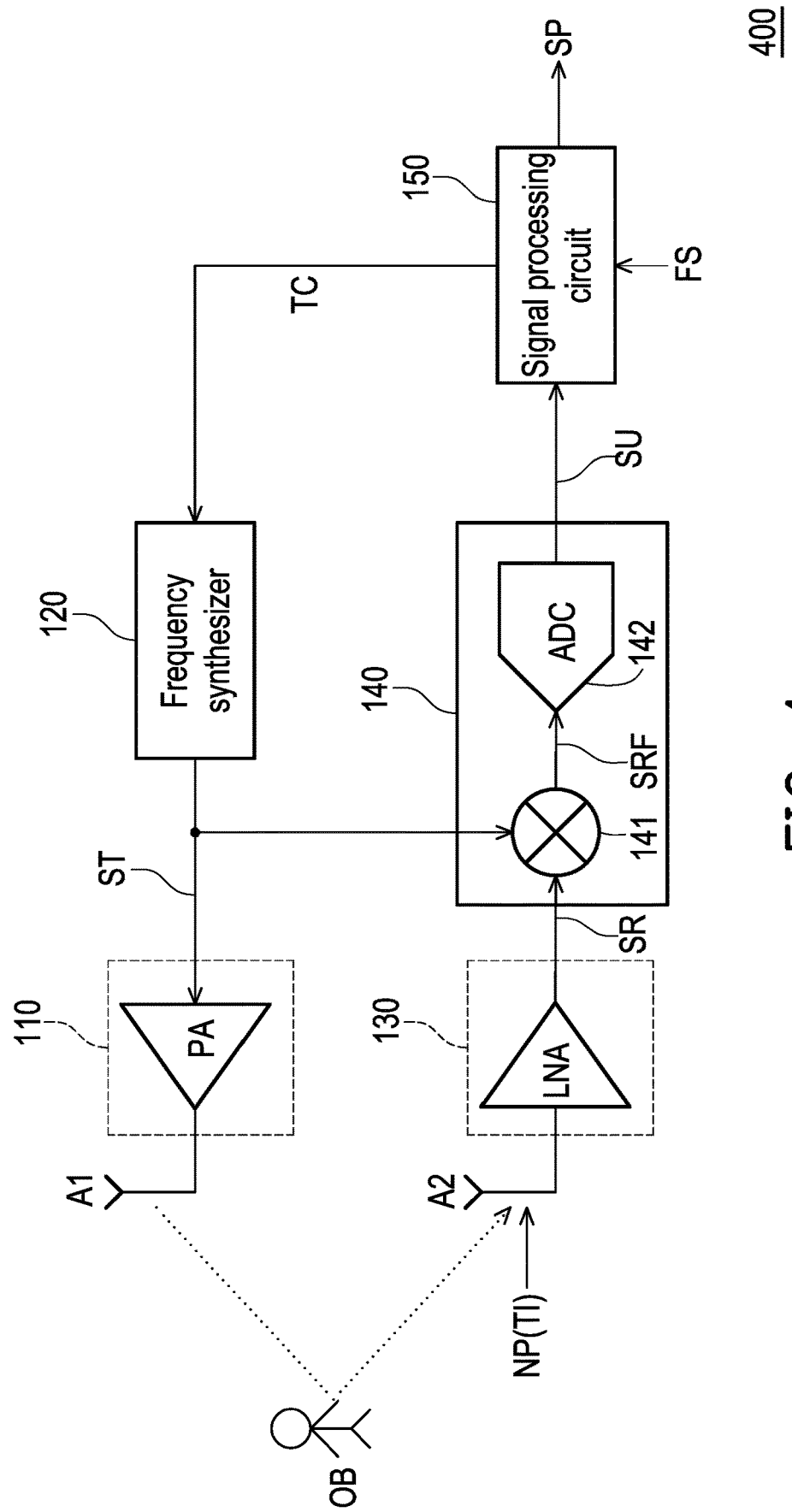
FIG. 4 is a circuit block diagram of a frequency modulated continuous wave radar device according to another embodiment of the disclosure.

FIG. 4 is a circuit block diagram of the FMCW radar device 400 according to another embodiment of the disclosure. In an embodiment shown in FIG. 4, the FMCW radar device 400 may include the transmitter stage circuit 110, the frequency synthesizer 120, the receiver stage circuit 130, the pre-stage circuit 140, and the signal processing circuit 150. The details of the transmitter stage circuit 110, the frequency synthesizer 120, the receiver stage circuit 130, the pre-stage circuit 140, and the signal processing circuit 150 shown in FIG. 4 may be referred to the relevant description of the transmitter stage circuit 110, the frequency synthesizer 120, the receiver stage circuit 130, the pre-stage circuit 140, and the signal processing circuit 150 shown in FIG. 1. Therefore, the relevant details will not be repeated in the following. The difference between the embodiment in FIG. 1 and the embodiment in FIG. 4 is that the FMCW radar device 400 may further include a transmitting antenna A1 and a receiving antenna A2. The transmitter stage circuit 110 may transmit the transmitting signal ST to the target object OB through the transmitting antenna A1. The receiver stage circuit 130 may receive the receiving signal SR formed by the transmitting signal ST reflected by the target object OB through the receiving antenna A2. In addition, in some embodiments, the signal processing circuit 150 may adjust the chirp period TC according to the receiving signal SR, so as to adjust the frequency of the transmitting signal ST.

According to the demand of design, in some embodiments, the transmitter stage circuit 110 may include a power amplifier PA or other type of signal amplifier. The power amplifier PA may amplify the transmitting signal ST. In some embodiments, the receiver stage circuit 130 may include a low noise amplifier LNA or other type of signal amplifier. The low noise amplifier LNA may amplify the receiving signal SR.

According to the demand of design, in some embodiments, the pre-stage circuit 140 may include a frequency mixer 141 and an analog-to-digital converter (ADC) circuit 142. The frequency mixer 141 may perform frequency mixing on the receiving signal SR and the transmitting signal ST to output a radio frequency signal SRF. Since the receiving signal SR is formed after the transmitting signal ST is transmitted to and reflected by the target object OB, there may be a time delay and (or) a frequency deviation between the transmitting signal ST and the receiving signal SR. Therefore, the frequency mixer 141 may output a frequency difference of the transmitting signal ST and the receiving signal SR at the same timing point. An input end of the ADC circuit 142 may be coupled to an output end of the frequency mixer 141 to receive the radio frequency signal SRF. The ADC circuit 142 May convert the radio frequency signal SRF (an analog signal) into the to-be-processed signal SU (a digital signal).

According to the demand of design, in some embodiments, to make it convenient for the signal processing circuit 150 to perform further signal processing and radar detection determination (e.g. performing fast Fourier transform), in addition to grouping the frames in the to-be-processed signal SU according to the sampling frequency FS, the signal processing circuit 150 may further, for each of the frame groups, set a number of samples of each frame as a number in power of 2. For example, it may be set as 64, 128, 256, or other number.

Figure 5:
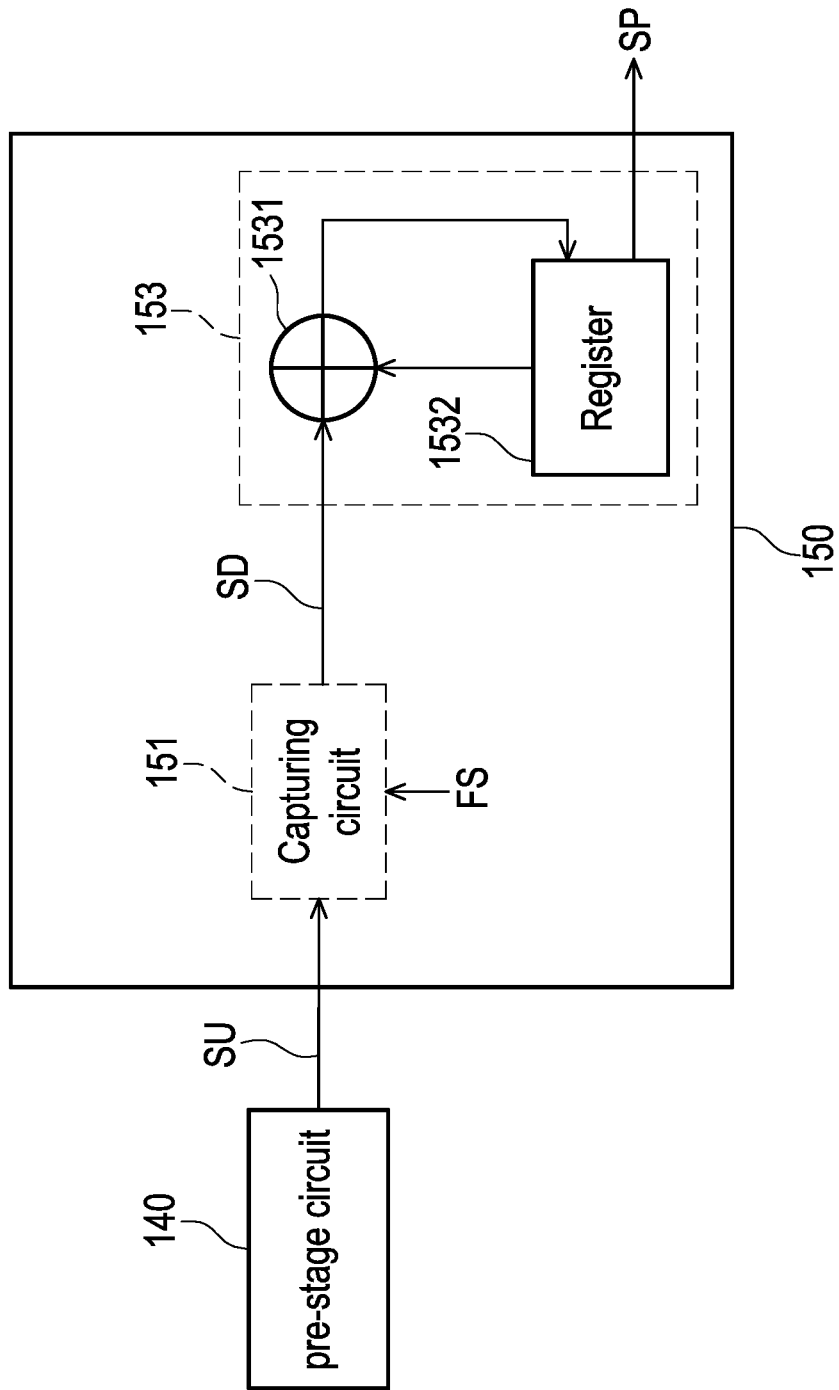
FIG. 5 is a circuit block diagram of a signal processing circuit according to an embodiment of the disclosure.

FIG. 5 is a circuit block diagram of a signal processing circuit 150 according to an embodiment of the disclosure. According to the actual design, the details of the signal processing circuit 150 shown in FIG. 1 and (or) the signal processing circuit 150 shown in FIG. 4 may be referred to the relevant description of the signal processing circuit 150 shown in FIG. 5. In an embodiment shown in FIG. 5, the signal processing circuit 150 may include a capturing circuit 151 and an accumulation circuit 153. The capturing circuit 151 is coupled to the pre-stage circuit 140. The capturing circuit 151 may capture the to-be-processed signal SU according to the sampling frequency FS to generate a resampling signal SD. In some embodiment, for each of the frames, a number of samples of the resembling signal SD may be set as a number in power of 2. The signal processing circuit 150 may generate the processed signal SP according to the resampling signal SD.

For example, assuming that the noise period TI is 16.66 ms and the sampling frequency FS is set to be 24414.0625 Hz, the capturing circuit 151 may capture the to-be-processed signal SU according to the sampling frequency FS, such that, in each of the frame groups, each frame may have 68 samples. That is, the chirp period TC is 68*1/24414.0625=2.78528 ms, and each of the frame groups has approximately 6 frames. In the equation of the relation between the chirp period TC and the noise period TI (K*TI=N*TC), the value K is 1, and the value N is 6. Or, assuming that the noise period TI is also 16.66 ms and the sampling frequency FS is set to be 48828.125 Hz, the capturing circuit 151 may capture the to-be-processed signal SU according to the sampling frequency FS, such that, in each of the frame groups, each frame may have 68 samples. That is, the chirp period TC is 68*1/48828.125=1.39264 ms, and each of the frame groups has approximately 12 frames. In the equation above, the value K is 1, and the value N is 12. The capturing circuit 151 may further adjust, for each frame of each of the frame groups in the to-be-processed signal SU, the 68 samples into 64 (in power of 2) samples to generate the resampling signal SD. For example, in some embodiments, the capturing circuit 151 may ignore the first and the last two samples of each frame. In other embodiments, the capturing circuit 151 may ignore, by ways of delay capturing, the first four samples of each frame in the to-be-processed signal SU to generate the resampling SD. In some embodiments, the capturing circuit 151 may achieve sample number adjustment by adopting a switch circuit or a corresponding method.

The details of the pre-stage circuit 140 and the signal processing circuit 150 shown in FIG. 5 may be referred to the relevant description of the pre-stage circuit 140 and the signal processing circuit 150 shown in FIG. 1 or the pre-stage circuit 140 and the signal processing circuit 150 shown in FIG. 4. Therefore, the relevant details are not repeated in the following. In the embodiment shown in FIG. 5, the accumulation circuit 153 may be coupled to the capturing circuit 151 to receive the resampling signal SD. The accumulation circuit 153 may receive and accumulate the multiple frames in a current frame group of multiple frame groups in the resampling signal to generate an accumulated frame. In some embodiments, the accumulation circuit 153 may be realized through an adder 1531 and a register 1532. A first input end of the adder 1531 may be coupled to an output end of the capturing circuit 151 to receive the resampling signal SD. An input end of the register 1532 may be coupled to an output end of the adder 1531 to receive the accumulated frame. An output end of the register 1532 outputs a new accumulated frame to a second input end of the adder 1531 to refresh the accumulated frame of the register 1532. The accumulated frame output by the output end of the register 1532 may serve as the processed signal SP for the current frame group.

Figure 6:
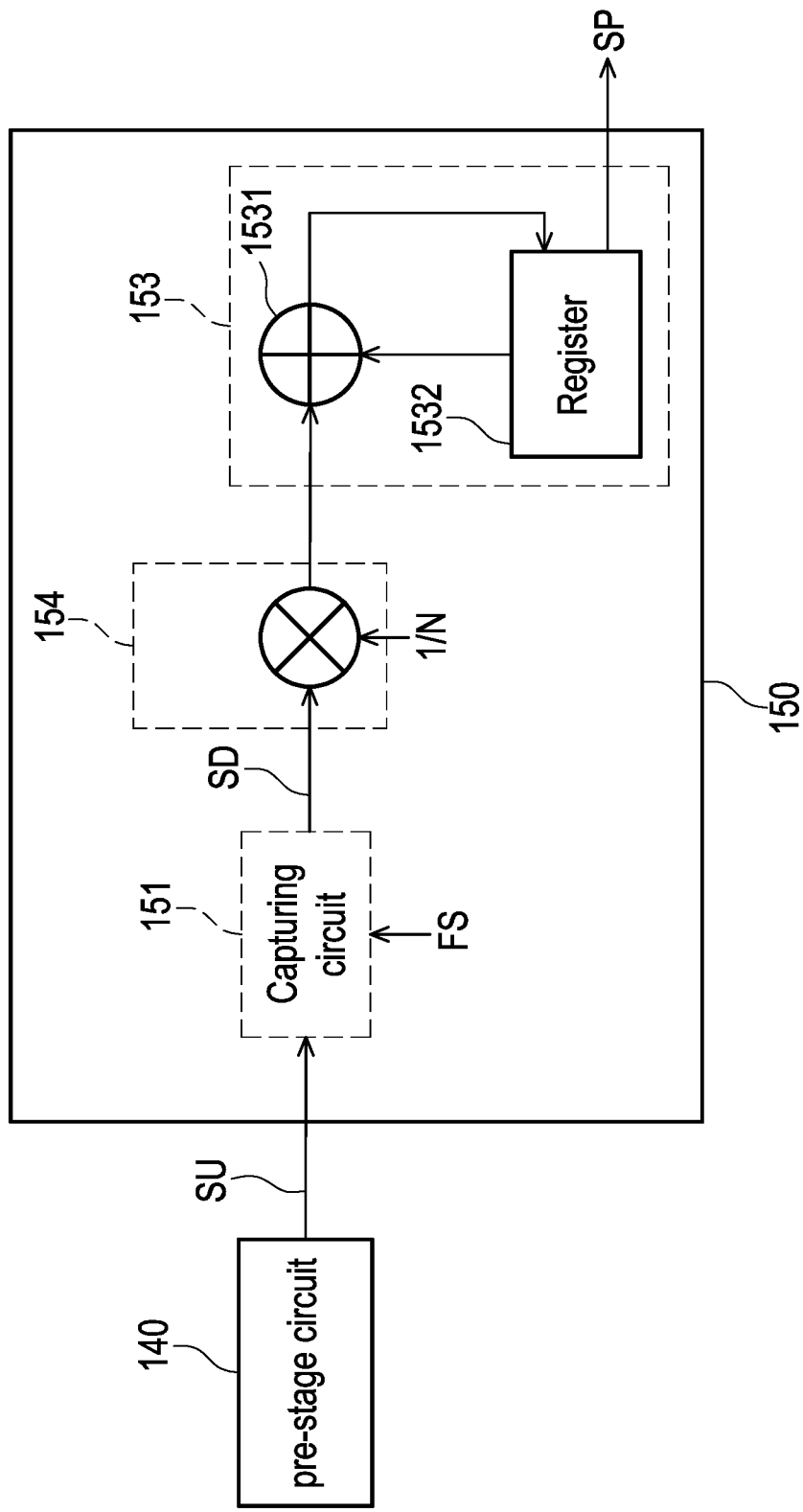
FIG. 6 is a circuit block diagram of a signal processing circuit according to still another embodiment of the disclosure.

FIG. 6 is a circuit block diagram of a signal processing circuit 150 according to still another embodiment of the disclosure. According to the actual design, the details of the signal processing circuit 150 shown in FIG. 1 and (or) the signal processing circuit 150 shown in FIG. 4 may referred to the relevant description of the signal processing circuit 150 shown in FIG. 6. In an embodiment shown in FIG. 6, the signal processing circuit 150 may include the capturing circuit 151, the accumulation circuit 153, and a multiplication circuit 154. The details of the capturing circuit 151 and the accumulation circuit 153 shown in FIG. 6 may referred to the relevant description of the capturing circuit 151 and the accumulation circuit 153 shown in FIG. 5. Therefore, the relevant details are not repeated in the following. In the embodiment shown in FIG. 6, an input end of the multiplication circuit 154 may be coupled to the output end of the capturing circuit 151 to receive the resampling signal SD. In the embodiment, the multiplication circuit 154 may perform a multiplication operation on the multiple frames in a current frame group of the frame groups of the resampling signal SD to generate multiplied frames. An input end of the accumulation circuit 153 may be coupled to an output end of the multiplication circuit 154 to receive and accumulate the multiplied frames in the current frame group to generate an accumulated frame. The accumulated frame serves as the processed signal SP for the current frame group. For example, in some embodiments, assuming that the current frame group has N frames, the multiplication circuit 154 may multiply each of the frames by a value 1/N. In other words, the operations performed on the frames in the current frame group by the multiplication circuit 154 and the accumulation circuit 153 is equivalent to an average operation.

Figure 7:
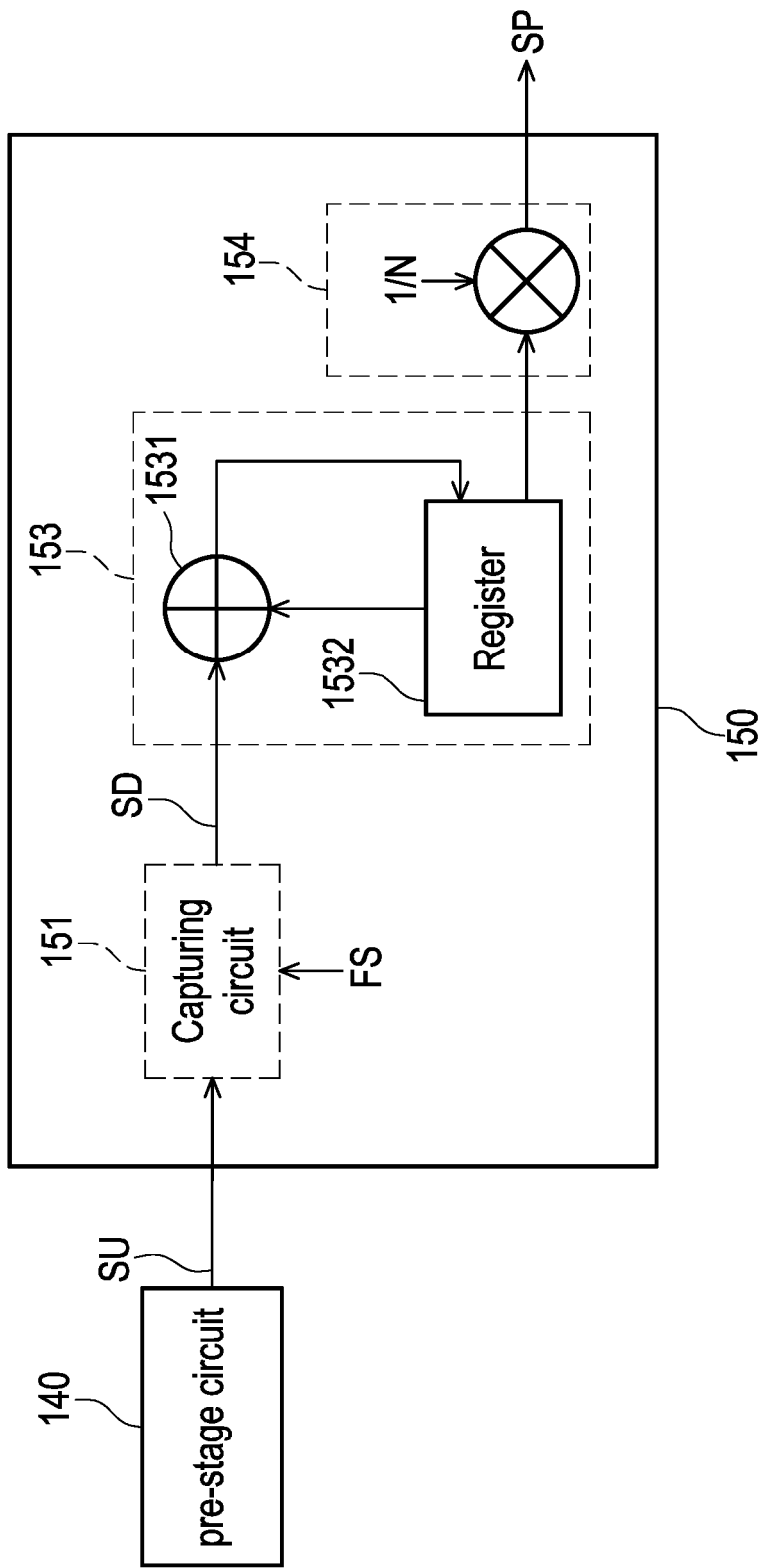
FIG. 7 is a circuit block diagram of a signal processing circuit according to yet another embodiment of the disclosure.

FIG. 7 is a circuit block diagram of a signal processing circuit 150 according to yet another embodiment of the disclosure. According to the actual design, the details of the signal processing circuit 150 shown in FIG. 1 and (or) the signal processing circuit 150 shown in FIG. 4 may referred to the relevant description of the signal processing circuit 150 shown in FIG. 7. In an embodiment shown in FIG. 7, the signal processing circuit 150 may include the capturing circuit 151, the accumulation circuit 153, and the multiplication circuit 154. The details of the capturing circuit 151 and the accumulation circuit 153 shown in FIG. 7 may be referred to the relevant description of the capturing circuit 151 and the accumulation circuit 153 shown in FIG. 5. Therefore, the relevant details are not repeated in the following. In the embodiment shown in FIG. 7, the input end of the multiplication circuit 154 may be coupled to an output end of the accumulation circuit 153 to perform the multiplication operation on the accumulated frame in the current frame group to generate the multiplied frame. The multiplied frame serves as the processed signal SP for the current frame group. For example, in some embodiments, assuming that the current frame group has N frames, the multiplication circuit 154 may multiply the accumulated frame by the value 1/N. In other words, the operations performed on the frames in the current frame group by the accumulation circuit 153 and the multiplication circuit 154 is equivalent to an average operation.

Figure 8:
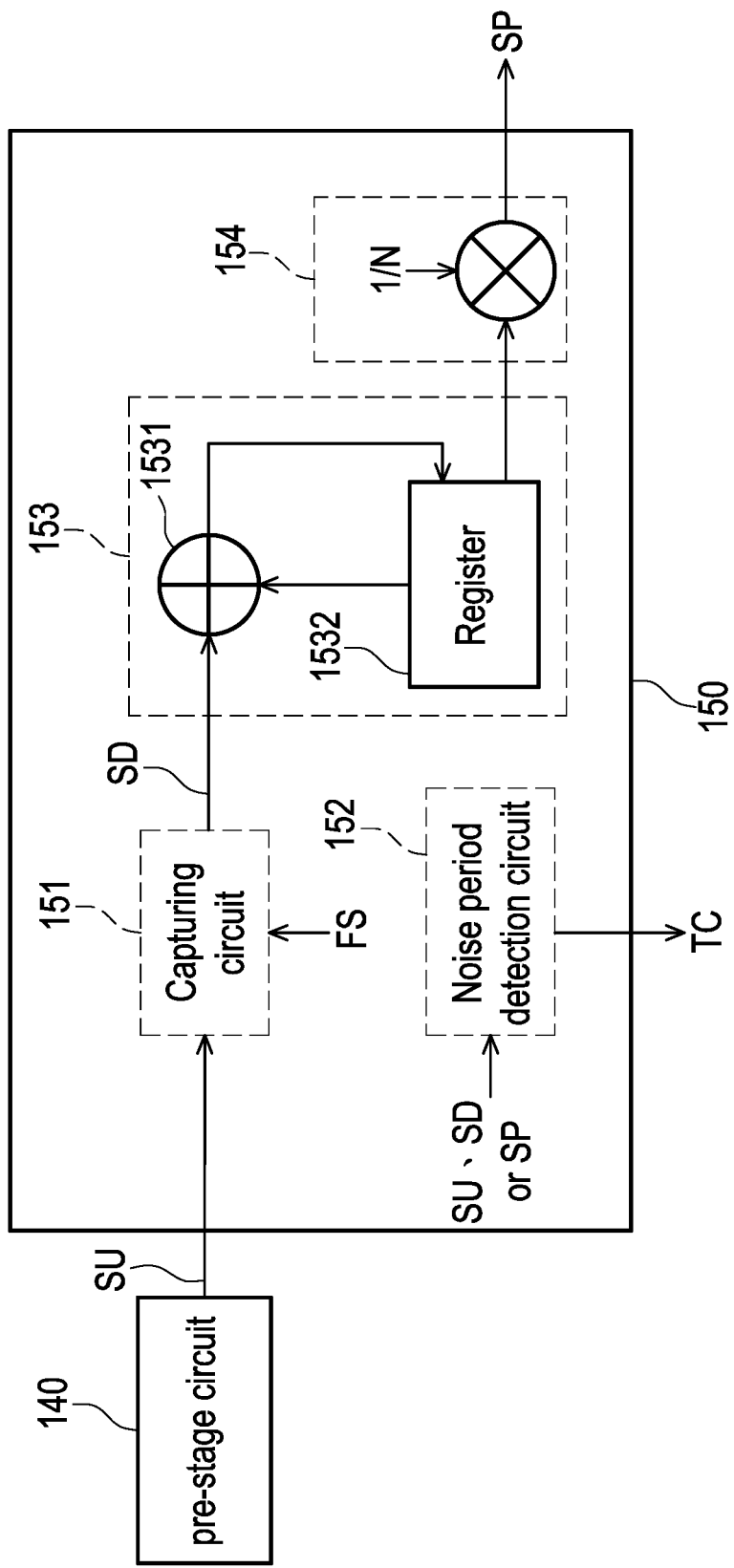
FIG. 8 is a circuit block diagram of a signal processing circuit according to yet another embodiment of the disclosure.

FIG. 8 is a circuit block diagram of a signal processing circuit 150 according to yet another embodiment of the disclosure. In an embodiment shown in FIG. 8, the signal processing circuit 150 may further include a noise period detection circuit 152. The noise period detection circuit 152 may be coupled to the pre-stage circuit 140, the capturing circuit 151, and (or) an output end of the signal processing circuit 150 to detect the noise period TI of the periodic interference signal NP according to at least one of the to-be-processed signal SU, the resampling signal SD, and the processed signal SP. In some embodiments, the noise period detection circuit 152 may adjust the chirp period TC according to the noise period TI so that the frequency synthesizer 120 may adjust the frequency of the transmitting signal ST according to the chirp period TC.

In summary of the above, in the FMCW radar device and the signal processing method thereof described in various embodiments of the disclosure, the transmitting signal is transmitted through the transmitter stage circuit according to the chirp period associated with the noise period. The receiving signal is formed after the transmitting signal is reflected by the target object and received by the receiver stage circuit. Then, the to-be-processed signal including the multiple frames is output through the pre-stage circuit, and the frames are grouped into the multiple frame groups by the signal processing circuit according to the sampling frequency associated with the chirp period. At least one of the multiple frames in each of the frame groups is sampled according to an identical sampling rule so that the influence of the periodic interference signal in the receiving signal is reduced to and the reliability of the radar device is enhanced.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A frequency modulated continuous wave radar device, comprising:
   a transmitter stage circuit, configured to transmit a transmitting signal;
   a frequency synthesizer, coupled to the transmitter stage circuit, and configured to generate the transmitting signal associated with a chirp period, wherein a frequency of the transmitting signal changes with time in the chirp period;
   a receiver stage circuit, configured to receive a receiving signal, wherein the receiving signal is formed after the transmitting signal is transmitted to a target object and reflected, and the receiving signal comprises a periodic interference signal with a noise period;
   a pre-stage circuit, coupled to the frequency synthesizer and the receiver stage circuit, and configured to output a to-be-processed signal according to the receiving signal and the transmitting signal, wherein the to-be-processed signal comprises a plurality of frames; and
   a signal processing circuit, coupled to the pre-stage circuit, wherein the signal processing circuit groups the plurality of frames into a plurality of frame groups according to a sampling frequency associated with the noise period, and the signal processing circuit generates a processed signal by sampling at least one frame from multiple frames in each of the plurality of frame groups with an identical sampling rule, so that a same sequential position of sampled frames in each of the plurality of frame groups has an identical noise influence of the periodic interference signal.

2. The frequency modulated continuous wave radar device according to claim 1, wherein a relation between the chirp period and the noise period is that a product of a first value and the noise period is approximately equal to a product of a second value and the chirp period, wherein the first value and the second value are both positive integers.

3. The frequency modulated continuous wave radar device according to claim 2, wherein being approximately equal to is defined that a difference between the product of the first value and the noise period and the product of the second value and the chirp period does not exceed 1%.

4. The frequency modulated continuous wave radar device according to claim 1, wherein a number of samples for each frame of the plurality of frames is a number in power of 2.

5. The frequency modulated continuous wave radar device according to claim 1, wherein the identical sampling rule comprises:
in a current frame group of the plurality of frame groups, selecting at least one frame from the multiple frames of the current frame group as the processed signal for the current frame group,
wherein a sequential position of the at least one frame selected in a frame group of the plurality of frame groups is the same as a sequential position of the at least one frame selected in another frame group of the plurality of frame groups.

6. The frequency modulated continuous wave radar device according to claim 1, wherein the identical sampling rule comprises:
in a current frame group of the plurality of frame groups, selecting a plurality of frames from the multiple frames of the current frame group,
based on the plurality of frames selected in the current frame group, performing an accumulation operation to generate an accumulated frame, and
using the accumulated frame as the processed signal for the current frame group,
wherein sequential positions of the plurality of frames selected in a frame group of the plurality of frame groups are the same as sequential positions of the plurality of frames selected in another frame group of the plurality of frame groups.

7. The frequency modulated continuous wave radar device according to claim 1, wherein the identical sampling rule comprises:
in a current frame group of the plurality of frame groups, selecting a plurality of frames from the multiple frames of the current frame group,
based on the plurality of frames selected in the current frame group, performing an average operation to generate an average frame, and
using the average frame as the processed signal for the current frame group,
wherein sequential positions of the plurality of frames selected in a frame group of the plurality of frame groups are the same as sequential positions of the plurality of frames selected in another frame group of the plurality of frame groups.

8. The frequency modulated continuous wave radar device according to claim 1, wherein the identical sampling rule comprises:
in a current frame group of the plurality of frame groups, sampling all the frames and performing an accumulation operation to generate an accumulated frame, and
using the accumulated frame as the processed signal for the current frame group.

9. The frequency modulated continuous wave radar device according to claim 1, wherein the identical sampling rule comprises:
in a current frame group of the plurality of frame groups, sampling a first part from the multiple frames of the current frame group and performing an accumulation operation to generate a first accumulated frame,
sampling a second part from the multiple frames of the current frame group and performing the accumulation operation to generate a second accumulated frame, and
using the first accumulated frame and the second accumulated frame as the processed signal for the current frame group.

10. The frequency modulated continuous wave radar device according to claim 1, wherein the identical sampling rule comprises:
in a current frame group of the plurality of frame groups, sampling all the frames and performing an average operation to generate an average frame, and
using the average frame as the processed signal for the current frame group.

11. The frequency modulated continuous wave radar device according to claim 1, wherein the identical sampling rule comprises:
in a current frame group of the plurality of frame groups, sampling a first part from the multiple frames of the current frame group and performing an average operation to generate a first average frame,
sampling a second part from the multiple frames of the current frame group and performing the average operation to generate a second average frame, and
using the first average frame and the second average frame as the processed signal for the current frame group.

12. The frequency modulated continuous wave radar device according to claim 1, wherein the signal processing circuit comprises:
a capturing circuit, configured to capture the to-be-processed signal according to the sampling frequency to generate a resampling signal, wherein the resampling signal comprises the plurality of frame groups, and the signal processing circuit is configured to generate the processed signal according to the resampling signal.

13. The frequency modulated continuous wave radar device according to claim 12, wherein the signal processing circuit further comprises:
an accumulation circuit, coupled to the capturing circuit, and configured to receive and accumulate the multiple frames in a current frame group of the plurality of frame groups of the resampling signal to generate an accumulated frame, wherein the accumulated frame serves as the processed signal for the current frame group.

14. The frequency modulated continuous wave radar device according to claim 12, wherein the signal processing circuit further comprises:
a multiplication circuit, coupled to the capturing circuit, and configured to perform a multiplication operation on the multiple frames in a current frame group of the plurality of frame groups of the resampling signal to generate a plurality of multiplied frames; and an accumulation circuit, coupled to the multiplication circuit, and configured to receive and accumulate the plurality of multiplied frames in the current frame group to generate an accumulated frame, wherein the accumulated frame serves as the processed signal for the current frame group.

15. The frequency modulated continuous wave radar device according to claim 12, wherein the signal processing circuit further comprises:

an accumulation circuit, coupled to the capturing circuit, and configured to receive and accumulate the multiple frames in a current frame group of the plurality of frame groups of the resampling signal to generate an accumulated frame; and a multiplication circuit, coupled to the accumulation circuit, and configured to perform a multiplication operation on the accumulated frame in the current frame group to generate a multiplied frame, wherein the multiplied frame serves as the processed signal for the current frame group.

16. The frequency modulated continuous wave radar device according to claim 12, wherein the signal processing circuit further comprises:

a noise period detection circuit, configured to detect the noise period of the periodic interference signal according to at least one of the to-be-processed signal, the resampling signal, and the processed signal and configured to adjust the chirp period according to the noise period.

17. The frequency modulated continuous wave radar device according to claim 1, wherein the pre-stage circuit comprises:

a frequency mixer configured to perform frequency mixing on the receiving signal and the transmitting signal to output a radio frequency signal; and an analog-to-digital converter circuit configured to convert the radio frequency signal into the to-be-processed signal.

18. The frequency modulated continuous wave radar device according to claim 1, wherein the transmitting signal is a frequency modulated continuous wave comprising a triangle frequency modulated continuous wave or a sawtooth frequency modulated continuous wave.

19. A signal processing method adapted to a frequency modulated continuous wave radar device, the signal processing method comprising:

generating a transmitting signal associated with a chirp period, wherein a frequency of the transmitting signal changes with time in the chirp period;

transmitting the transmitting signal;

receiving a receiving signal, wherein the receiving signal is formed after the transmitting signal is transmitted to a target object and reflected, and the receiving signal comprises a periodic interference signal with a noise period;

outputting a to-be-processed signal according to the receiving signal and the transmitting signal, wherein the to-be-processed signal comprises a plurality of frames;

grouping the plurality of frames into a plurality of frame groups according to a sampling frequency associated with the noise period; and generating a processed signal by sampling at least one frame from the multiple frames in each of the plurality of frame groups with an identical sampling rule, so that a same sequential position of sampled frames in each of the plurality of frame groups has an identical noise influence of the periodic interference signal.

20. The signal processing method according to claim 19, wherein a relation between the chirp period and the noise period is that a product of a first value and the noise period is approximately equal to a product of a second value and the chirp period, wherein the first value and the second value are both positive integers.

* * * * *